United States Patent
Vernardakis et al.

(10) Patent No.: US 6,454,842 B1
(45) Date of Patent: Sep. 24, 2002

(54) SCENTED INK COMPOSITION AND METHOD OF PREPARATION

(75) Inventors: Theodore G. Vernardakis; Natan Nasilevich, both of Cincinnati, OH (US)

(73) Assignee: BCM Inks USA Incorporated, Cincinnati, OH (US)

( * ) Notice: Subject to any disclaimer, the term of this patent is extended or adjusted under 35 U.S.C. 154(b) by 0 days.

(21) Appl. No.: 09/933,501

(22) Filed: Aug. 20, 2001

(51) Int. Cl.[7] ............................... C09D 1/00; C08F 2/32
(52) U.S. Cl. ............................... 106/31.02; 106/14.34; 106/14.35; 106/14.41; 106/31.26; 106/31.28; 106/31.29; 106/31.57; 524/801
(58) Field of Search ........................... 106/14.34, 14.35, 106/14.41, 31.02, 31.25, 31.28, 31.29, 31.57; 524/801

(56) References Cited

U.S. PATENT DOCUMENTS 5,018,974 A * 5/1991 Carnahan et al. ............ 428/905
5,577,947 A * 11/1996 Malloy et al. ............... 101/491
6,123,757 A * 9/2000 Yang et al. ................ 106/31.02
6,261,347 B1 * 7/2001 Moreland ................. 106/31.02

* cited by examiner

Primary Examiner—Samuel A. Acquah
(74) Attorney, Agent, or Firm—Sand & Sebolt

(57) ABSTRACT

A method of preparing a scented ink composition comprising the steps of first preparing a mixture which includes a polymer component consisting of a water soluble polymer selected form the group consisting of acrylic, styrene-maleic anhydride, sulfonated polyester, polyamide, and polyurethene. A color component which is selected from the group consisting of a pigment and a dye, and a solvent component comprising water are also provided. The mixture is then agitated. An oil-based fragrance is then blended into this mixture to produce a scented mixture and is then agitated. A microemulsion of the oil-based fragrance in water is created, wherein the resin stabilizes the microdroplets of the oil-based fragrance by coating the microdroplets. Preferably, the microdroplets of the oil-based fragrance have a diameter of from about 0.1 to about 1.0 micrometers.

30 Claims, No Drawings

SCENTED INK COMPOSITION AND METHOD OF PREPARATION

CROSS REFERENCE TO RELATED APPLICATION

This application is not related to any other pending application.

BACKGROUND OF THE INVENTION

1. Technical Field

The present invention relates to coatings and more particularly to inks. Still more particularly, the present invention relates to coatings which contain components which are odor masking, odor reducing, or perfuming.

2. Background Information

The prior art discloses the use of fragrant or scented inks for use in various packaging and novelty applications. U.S. Pat. No. 5,018,974 to Carnahan, et al., for example, discloses a publication with image areas that release an appropriate fragrance upon being colored or painted by the user. Microcapsules that contain fragrance oil for a particular fragrance associated with the image area are deposited on the image area of the substrate. Inert walls of materials such as gelatin restrain the fragrance within the microcapsules until activated. A color dispenser such as a felt tip marking pen is adapted to include a reactive agent that when applied to the image area in the normal course of coloring will cause release of the fragrance by rupturing or otherwise interacting with the microcapsules such as by diffusing into the microcapsules and replacing and releasing the oil. The reactive agent may be a solvent such as an alcohol or ketone or a surfactant contained in an aqueous solution mixed with the normal ink or paint of the marking pen. The invention enables release of fragrances in the normal course of coloring an image without requiring action such as scratching or pulling apart of the sheets on which the image is placed.

U.S. Pat. No. 5,577,947 to Malloy, et al. discloses a scented ink composition and method of printing in which a scented ink image is applied to a novelty item such as a balloon. The scented ink comprises a mixture of a conventional printing ink with a fragrant oil wherein the fragrant oil is added to the printing ink at a concentration from 4–7% by weight. After mixing, the scented ink solution is used in place of conventional printing ink in a flexographic printing press, and the press is operated in a normal fashion to print images on metalized nylon sheeting used in the manufacture of balloons. After printing the scented ink images onto the sheeting, the image is dried in a conventional manner and the matter is wrapped in polyethylene for storage until used in the manufacture of the balloons.

U.S. Pat. No. 6,123,757 to Yang, et al. discloses a fragrant ink for use in a microjet printer. This fragrant ink composition comprises an alcohol component in an amount of 1–20% by weight, an imaging component which may be a pigment used in the amount of 1–10% by weight, a fragrant agent component used in the amount of 0.05–20% by weight, and an additional ethanol component used in the amount of 2–20% by weight which reduces drying time of the ink.

A problem, however, which has attended the use of scented or fragrant ink in that the scents or fragrances may not last for extended periods of time. Particularly for packaging applications, the failure of ink to retain its scent over an extended period of time, where the package may be in storage or shipping, may seriously detract from the overall desirability of using the scented ink.

BRIEF SUMMARY OF THE INVENTION

It is an object of the present invention to provide a scented ink which retains its scent or fragrance over an extended period of time.

This and other objects are met by the present invention which is a method of preparing a scented ink composition comprising the steps of first preparing a mixture which includes a resin component consisting of a water soluble polymer selected from the group consisting of acrylic, styrene-maleic anhydride, sulfonated polyester, polyamide, and polyurethane, a color component selected from the group consisting of a pigment and a dye, and a solvent component comprising water. The mixture is then agitated. An oil-based fragrance is blended into this mixture to produce a scented mixture, and is then agitated. A microemulsion of the oil-based fragrance in water is created, wherein the resin stabilizes the microdroplets of the oil-based fragrance by coating the microdroplets. Preferably, the microdroplets of the oil-based fragrance have a diameter of from about 0.1 to about 1.0 micrometers.

Also encompassed by the present invention is a scented ink composition produced by a method comprising the steps of first preparing a mixture which includes a resin component consisting of a water soluble polymer selected from the group consisting of acrylic, styrene-maleic anhydride, sulfonated polyester, polyamide, and polyurethane, a color component selected from the group consisting of a pigment and a dye, and a solvent component comprising water. The mixture is then agitated. An oil-based fragrance is blended into this mixture to produce a scented mixture, and is then agitated. A microemulsion of the oil-based fragrance in water is created, wherein the resin stabilizes the microdroplets of the oil-based fragrance by coating the microdroplets. Preferably, the microdroplets of the oil-based fragrance have a diameter of from about 0.1 to about 1.0 micrometers. It is also believed that in this composition these microdroplets will tend to be coated by the resin component.

DETAILED DESCRIPTION OF THE INVENTION

The resin component of the ink will preferably be provided by an acrylic varnish in the amount of 15%–45% by weight of the entire composition and an acrylic emulsion in the amount of 0–30% by weight of the entire composition. The acrylic varnish has a solids content of about 20% to about 40% by weight. The solvent for the acrylic varnish is water. A general procedure for preparing this acrylic varnish is as follows. Water is added in a mill (Kady) or high speed mixer. Ammonia (21°Bé) is added and mixed with water. The polymer is added and mixed until completely dissolved.

The acrylic emulsion is an emulsion of acrylic monomers and a water solvent. These monomers may be selected from methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acrylic acid, methacrylic acid, itaconic acid, malic acid, fumaric acid, acrylic anhydride, methacrylic anhydride, maleic anhydride, itaconic anhydride, fumaric anhydride, styrene, substitued styrene, vinyl acetate, and other C.sub.1 to C.sub.12 alkyl acrylates and methacrylates. Polymerization of the above monomers takes place in situ by emulsion polymerization. Preferably, the glass transition temperature of the polymer is in the range of about −40° C. to about +50° C.

In a preferred composition, the pigment dispersion will be used in the amount of 25%–65% by weight. This pigment dispersion may be either an organic or inorganic pigment dispersion. Preferred organic pigments are phthalocyanines, azos, naphthols, and rhodamines. Preferred inorganic pigments are titanium oxide, iron oxides, and carbon black. Preferred carriers are water, acrylic resin solution, glycol, and surfactant. Preferably, the pigment particles will have a particle size of less than about 3000 nanometers. (3 micrometers). Alternatively, the color component may be a dye. Suitable dyes include acid, basic, direct, and disperse dyes.

Deionized water in the amount of 0–15% by weight will next be added to the mixture. A wax compound which will preferably be a polymeric wax selected from polyethylene (PE), polypropylene (PP), polytetrafluoroethylene (PTFE), or a blend of polyethylene (PE) and polytetrafluoroethylene (PTFE) will then be added to the mixture in the amount of 3%–6% by weight. A defoamer which will preferably be mineral oil, silicone, polysiloxane, or silicone-free will then be added to the mixture in the amount of 0.2%–0.5% by weight after which the mixture will be added to a mixing vessel and blended under high speed mixing preferably for at least about 15 minutes. An oil based fragrance is added last, slowly and under high speed mixing, to affect a emulsification of the fragrance in the water system. Suitable oil based fragrances include chocolate, cherry, lemon, peppermint, coffee and similar fragrances. During the manufacturing process, a microemulsion of the oil-based fragrance in water is created via high speed mixing. The microdroplets of the fragrance are stabilized by the high solids content of the acrylic varnish/acrylic emulsion system, whereby the resin molecules coat the microdroplets of the fragrance to ensure stability and long lasting effect of the scent. The process is preferably carried out at room temperature and at normal atmospheric pressure. The viscosity of the final ink is preferably in the range of 20–35 seconds as measured in a #4DIN Cup. The pH will preferably be between 8.0–9.5. Both viscosity and pH are typical for water based flexographic inks.

The method of the present invention is further described with reference to the following examples.

EXAMPLE A

A varnish was made by adding liquid components 1–4 and 6 into a Kady mill in their order shown in Table I. The resin component 5 was then added and mixing was done until all resin was dissolved.

TABLE I

| COMPONENT | DESCRIPTION | % BY WEIGHT |
|---|---|---|
| 1. | Water | 51.4% |
| 2. | MEA (HVC) | 4.0% |
| 3. | Aqua Ammonia 21° Bammé (HVC) | 6.6% |
| 4. | Defoamer - Foamaster WB (Zimmerman) | 0.5% |
| 5. | Joncryl 678 Resin (Johnson) | 34.0% |
| 6. | Dowanol PM Solvent (HVC) | 3.5% |

EXAMPLE B

Another varnish was made by adding liquid components 1–4 and 6 from Table II into a Kady mill in their order shown in Table II. The resin component 5 from Table II is then added and mixing is done until all resin is dissolved.

TABLE II

| COMPONENT | DESCRIPTION | % BY WEIGHT |
|---|---|---|
| 1. | Water | 53.0% |
| 2. | MEA (HVC) | 6.0% |
| 3. | Aqua Ammonia 21° Bammé (HVC) | 3.2% |
| 4. | Defoamer - Foamaster WB (Zimmerman) | 0.3% |
| 5. | Joncoyl 678 Resin | 34.0% |
| 6. | Dowanol PM Solvent (HVC) | 3.5% |

EXAMPLE 1

Components 1–2, the varnish and polymer emulsion shown in Table III, were added to a high speed mixer. Components 3–6 in Table III, the pigment dispersion, water, and defoamer, respectively, were then also added to the mixer. These components were then mixed at a speed of 1000 RPM for a period of 15 minutes. Component 7 from Table III, the oil-based fragrance, was then added while mixing continued. After addition of the fragrance, mixing continued at a speed of 1000 RPM for a period of 15 minutes.

TABLE III

| COMPONENT | DESCRIPTION | % BY WEIGHT |
|---|---|---|
| 1. | Varnish from Example "A" | 30.30% |
| 2. | Joncryl SCX-2630 (Johnson) | 6.00% |
| 3. | Black-BK7R162 Carbon (Reitech) | 50.00% |
| 4. | Water | 4.00% |
| 5. | Wax Compound 8855B (08-15223) | 4.50% |
| 6. | Defoamer Foammaster WB (Zimmerman) | 0.20% |
| 7. | (S) chocolate (FG8640) Intercontinental | 5.00% |

EXAMPLE 2

In this example the components shown in Table IV, component 1, which was a varnish, and component 2, which was the acrylic emulsion, were added to the mixer used in Example 1 along with components 3–5 which were pigment dispersions and components 6–8, respectively the water, wax compound, and defoamer. These components were blended in the mixer at a speed of 1000 RPM for a period of 15 minutes. While mixing continued, the fragrant component was added, after which mixing continued at a speed of 1000 RPM for an additional 15 minutes.

TABLE IV

| COMPONENT | DESCRIPTION | % BY WEIGHT |
|---|---|---|
| 1. | Varnish from Example "B" | 21.00% |
| 2. | A-6037 (Zeneca) (Neo-Resins) | 10.00% |
| 3. | Blue-BFD4291 Flexiverse (Sun) | 28.00% |
| 4. | Yellow-YCD 9274 Blend (Sun) | 14.00% |
| 5. | Black-BK7R162 | 6.00% |

TABLE IV-continued

| COMPONENT | DESCRIPTION | % BY WEIGHT |
|---|---|---|
| | Carbon (Reitech) | |
| 6. | Water | 5.00% |
| 7. | Wax Compound 8855B (08-15223) | 5.00% |
| 8. | Defoamer Foamaster WB (Zimmerman) | 0.20% |
| 9. | (S) Coffee (FG6006) Intercontinental | 10.80% |

EXAMPLE 3

In this example the components shown in Table V were used. Component 1, which was acrylic varnish, and component 2, which was acrylic emulsion, were added to the mixer used in the previous Example 1 along with components 3–5 which were pigment dispersions. Components 6, 7, and 8, respectively water, wax compound, and defoamer, were then added to the mixture, after which the mixture was blended at a speed of 1000 RPM for a period of 15 minutes. While blending continued, component 9, the fragrance, was added after which mixing continued for an additional 15 minutes. The viscosity of the completed ink was 20–30 #DIN, and the pH was 8.8–9.3.

TABLE V

| COMPONENT | DESCRIPTION | % BY WEIGHT |
|---|---|---|
| 1. | Varnish from Example "B" | 20.00% |
| 2. | A-6037 (Zeneca) (Neo-Resins) | 7.00% |
| 3. | Blue-BFD4291 Flexiverse (Sun) | 5.00% |
| 4. | Yellow-YCD 9274 Blend (Sun) | 20.00% |
| 5. | Green-DC-G-07001 Decosperse 7 (Quaker) | 28.00% |
| 6. | Water | 10.00% |
| 7. | Wax Compound 8855B (08-15223) | 4.50% |
| 8. | Defoamer Foammaster WB (Zimmerman) | 0.20% |
| 9. | (S) Peppermint (FG0348) Intercon | 5.30% |

EXAMPLE 4

In this example the components shown in Table VI are used. Component 1, which is a commercially available styrenated-maleic anhydride resin, and component 2 which is an acrylic emulsion, are added to the mixer used in Example 1 along with component 3 which is a pigment dispersion and components 4–6, respectively the water, wax compound and defoamer. These components are blended in the mixer at a speed of 1000 RPM for a period of 15 minutes. While mixing continues, the fragrant component 7 is added after which mixing continues at a speed of 1000 RPM for an additional 15 minutes.

TABLE VI

| COMPONENTS | DESCRIPTION | % BY WEIGHT |
|---|---|---|
| 1. | SMA 17352H (Elf A-to-chem) | 15.0% |

TABLE VI-continued

| COMPONENTS | DESCRIPTION | % BY WEIGHT |
|---|---|---|
| 2. | Joncryl ECO-2177 (Johnson) | 40.0% |
| 3. | Yellow - YGD9374 (Sun) | 32.0% |
| 4. | Water | 2.3% |
| 5. | Wax Compound 8855B (08-15223) | 4.5% |
| 6. | Defoamer - Foamaster WB (Zimmerman) | 0.2% |
| 7. | (S) Lemon (FG0160) Intercontinental | 6.0% |

EXAMPLE 5

In this example the components shown in Table VII are used. Components 1 and 2 which are commercially available sulfonated polyester resins are added to the mixer used in Example 1 along with component 3 which is a pigment dispersion and components 4–6 which are respectively the water, wax compound and defoamer. These compounds are blended, in the mixer at a speed of 1000 RPM for a period of 15 minutes. While mixing continues, the fragrant component 7 is added after which mixing continues at a speed of 1000 RPM for an additional 15 minutes.

TABLE VII

| COMPONENT | DESCRIPTION | % BY WEIGHT |
|---|---|---|
| 1. | Eastek 2140 (Eastman) | 42.8% |
| 2. | Eastek 1300 (Eastman) | 14.0% |
| 3. | Blue levanyl G-LF-01 (Bayer) | 30.0% |
| 4. | Water | 2.5% |
| 5. | Surfynol 104PA Surfactant (Air Products) | 0.5% |
| 6. | Wax Compound 8855B (08-15223) | 4.5% |
| 7. | Defoamer Foamaster WB (Zimmerman) | 0.2% |
| 8. | (S) Cherry (FG9454) Intercontinental | 5.5% |

Table VIII shows pH, viscosity and fragrance durability for the inks made in Examples 1–3.

As is shown in Table VIII, inks made according to these examples, surprisingly and unexpectedly, maintain their fragrance for substantially longer periods of time than do many conventional scented inks.

TABLE VIII

| INK | pH | VISCOSITY (SEC) #4 DIN CUP | FRAGRANCE DURABILITY (IN OPEN AIR AFTER PRINTING |
|---|---|---|---|
| Example 1 | 8.3–9.0 | 20–25 | Approximately 2 weeks |
| Example 2 | 8.3–9.0 | 20–25 | Approximately 2 weeks |
| Example 3 | 8.8–9.3 | 20–30 | Approximately 2 weeks |

While not intending to be bound by any theory of why the method described herein produces inks with the extended fragrance durability, it is believed that this advantageous result occurs at least in part due to the sequence of first mixing and agitating all the components except the fragrance and then adding the fragrance and again agitating. It is also believed that a microemulsion of the oil based fragrance in water is formed with microdroplets having diameters of from about 0.1 micrometer to about 1.0 micrometer and that the resin component coats these microdroplets. Such coating of the microdroplets by the resin component is also believed to contribute to extended fragrance durability.

The inks are applied to the substrate by conventional means utilizing water flexographic printing presses.

It will be appreciated that a scented ink and a method of its preparation which results in an ink which maintains its fragrance for an extended period of time. This ink may be prepared cost effectively, and may be used on a range of conventional packaging substrates.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of preparing a scented ink composition comprising the steps of:
   (a) preparing a mixture comprising:
      (i) a resin component consisting of a water soluble polymer selected from the group consisting of acrylic, styrenated maleic anhydride, sulfonated polyester, polyamide, and polyurethane or monomers thereof;
      (ii) a color component selected from the group consisting of a pigment and a dye; and
      (iii) a solvent component comprising water;
   (b) then agitating the mixture prepared in step (a);
   (c) then adding an oil based fragrance to the blended mixture prepared in steps (a) and (b) to produce a scented mixture; and
   (d) then agitating the scented mixture prepared in step (c).

2. The method of claim 1 wherein a microemulsion of the oil based fragrance in water is formed.

3. The method of claim 2 wherein the microemulsion of the oil based fragrance in water includes microdroplets of the oil based fragrance and the resin component stabilizes the microdroplets of the oil based fragrance.

4. The method of claim 3 wherein the resin component coats the microdroplets.

5. The method of claim 2 wherein the microdroplets of the oil based fragrance have a diameter of from about 0.1 micrometers to about 1.0 micrometers.

6. The method of claim 1 wherein in step (a) the mixture comprises an acrylic varnish, an acrylic emulsion, a pigment dispersion, and a wax compound.

7. The method of claim 1 wherein after step (b) the scented ink composition comprises an acrylic varnish in an amount of about 15% to about 45% by weight, pigment dispersion in the amount of about 25% to about 65% by weight, wax compound in the amount of about 3% to about 6% by weight, and the fragrance in the amount of about 4% to about 12% by weight.

8. The method of claim 7 wherein in step (a) water is added in the amount of less than about 15% by weight.

9. The method of claim 7 wherein a defoamer is added in the amount of about 0.2% to about 0.5% by weight.

10. The method of claim 1 wherein the completed scented ink composition has a viscosity of from about 20 seconds to about 35 seconds as measured in a #4DIN cup.

11. The method of claim 1 wherein the completed scented ink composition has a pH of from about 8.0 to about 9.5.

12. The method of claim 1 wherein the wax compound is selected form the group consisting of polyethylene, polypropylene, polytetrafluoroethylene, and mixture of polyethylene and polytetrafluoroethylene.

13. The method of claim 1 wherein the defoamer is selected from the group consisting of mineral oil, silicone, and polysiloxane.

14. The method of claim 1 wherein the fragrance is selected from the group consisting of chocolate, cherry, lemon, peppermint, and coffee.

15. The method of claim 7 wherein a microemulsion of the oil based fragrance in water is created.

16. The method of claim 15 wherein the acrylic varnish and acrylic emulsion stabilize the microdroplets of the oil based fragrance.

17. The method of claim 16 wherein the mocrodroplets each have a diameter and said diameter is from about 0.1 micrometer to about 1.0 micrometer.

18. The method of claim 6 wherein the acrylic varnish has a solids content of from about 20% to about 40% by weight.

19. The method of claim 1 wherein the pigment is selected from the group consisting of phthalocyanines, azos, naphthols, rhodamines, titanium oxide, iron oxides, and carbon black.

20. The method of claim 1 wherein the dye is selected from the group consisting of acid, basic, direct, and disperse dyes.

21. The method of claim 1 wherein the water soluble polymer has a glass transition temperature which is from about −40° C. to about +50° C.

22. The method of claim 1 wherein the color component is pigment dispersion in the amount of about 25% to about 65% by weight.

23. The method of claim 1 wherein the resin component is acrylic.

24. The method of claim 1 wherein the resin component is styrenated maleic andyride.

25. The method of claim 1 wherein the resin component is sulfonated polyester.

26. The method of claim 1 wherein the resin component is polyamide.

27. The method of claim 1 wherein the resin component is polyurethane.

28. A method of preparing a scented ink composition comprising the steps of:
   (a) preparing a mixture comprising:
      (i) a resin component consisting of a water soluble polymer selected from the group consisting of acrylic, styrenated maleic anhydride, sulfonated polyester, polyamide, and polyurethane or monomers thereof;
      (ii) a color component selected from the group consisting of a pigment and a dye; and (iii) a solvent component comprising water;
   (b) then agitating the mixture prepared in step (a);
   (c) then adding an oil based fragrance to the blended mixture prepared in step (a) and (b) to produce a scented mixture; and (d) then agitating the scented mixture prepared in step (c) to form a microemulsion of the oil based fragrance in the water.

29. A method of preparing a scented ink composition comprising the steps of:
- (a) preparing a mixture comprising:
    - (i) a resin component consisting of a water soluble polymer selected from the group consisting of acrylic, styrenated maleic anhydride, sulfonated polyester, polyamide, and polyurethane or monomers thereof in the amount of 15% to about 45% by weight;
    - (ii) a color component selected from the group consisting of a pigment and a dye; and
    - (iii) a solvent component comprising water in an amount less than 15% by weight;
- (b) then agitating the mixture prepared in step (a);
- (c) then adding an oil based fragrance in the amount of about 4% to about 12% by weight to the blended mixture prepared in steps (a) and (b) to produce a scented mixture; and
- (d) then agitating the scented mixture prepared in step (c) to form a microemulsion of the oil based fragrance in the water including microdroplets of the oil based fragrance, wherein each of said microdroplets has a diameter and said diameter is from about 0.1 micrometer, and at least some of said microdroplets are coated by said resin component.

30. A scented ink composition prepared by a method comprising the steps of:
- (a) preparing a mixture comprising:
    - (i) a resin component consisting of a water soluble polymer selected from the group consisting of acrylic, styrenated maleic anhydride, sulfonated polyester, polyamide, and polyurethane or monomers thereof;
    - (ii) a color component selected from the group consisting of a pigment and a dye; and
    - (iii) a solvent component comprising water;
- (b) then agitating the mixture prepared in step (a);
- (c) then adding an oil based fragrance to the blened mixture prepared in step (a) and (b) to produce a scented mixture; and
- (d) then agitating the scented mixture prepared in step (c).

* * * * *